United States Patent Office 3,471,293
Patented Oct. 7, 1969

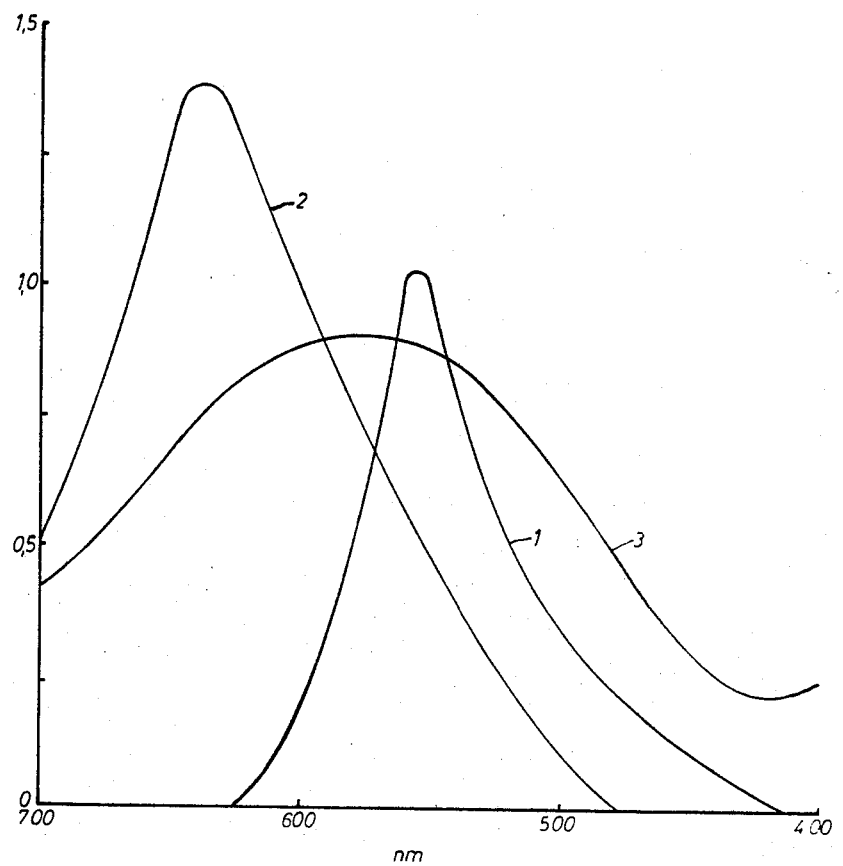

3,471,293
ANTIHALATION AND FILTER DYES FOR PHOTOGRAPHIC MATERIALS
Hans Öhlschläger, Cologne-Stammheim, and Oskar Riester, Herbert Müller, and Erich Reckziegel, Leverkusen, Germany, assignors to Agfa-Gevaert Aktiengesellschaft, Leverkusen, Germany, a corporation of Germany
Filed Sept. 4, 1968, Ser. No. 757,431
Claims priority, application Germany, Sept. 22, 1967, 1,597,482
Int. Cl. G03c 1/84
U.S. Cl. 96—84          3 Claims

ABSTRACT OF THE DISCLOSURE

This invention relates to photographic materials which contain an antihalation or filter layer, using the silver salts of the tri- and penta-methine oxonoles of thiobarbituric acids substituted with aliphatic groups as dyes.

---

It is common practice to apply to the rear surface of photographic films with colored gelatin layers. These layers are intended to prevent the film from curling (NC layers) and at the same time to absorb as completely as possible those rays which have not been absorbed by the emulsion layers, in order to prevent the formation of a reflected light halo. A further improvement can be obtained by applying the antihalation layer not to the rear face of the film but as a filter layer just below the light-sensitive silver halide emulsion layer.

If dyes are to be suitable for use in such NC and filter layers, they must meet numerous requirements; for example, they should have good absorption properties and should bleach out irreversibly and completely in the usual photographic processing baths. Furthermore, they should be readily soluble or dispersible so that they can be introduced into the layers in sufficiently high concentrations but they must be capable of being fixed in the layer so that they do not migrate into adjacent emulsion layers when the film is rolled up.

Filter layers are of particular importance in multi-layered color materials. Thus, for example, it is known that the sharpness and reproduction of green in regions of strong exposure can be improved by placing a filter layer which contains a dye which absorbs green light between a green-sensitive layer and a red-sensitive layer arranged below this green-sensitive layer. Such a dye not only has a have the qualities required of those used in black-white materials, such as resistance to diffusion and the capacity for discoloration but in addition it must have special absorption properties. For example, in the case described above, a dye must have a particularly steep decay of absorption towards longer wave-lengths so that all the red light can reach the underlying layer.

Amongst others, dyes of the oxonole series have been described as antihalation and filter dyes. In order to fix such dyes so that they will be resistant to diffusion, it has already been proposed to add guanidines, polymers which contain amino groups and similar basic compounds to the gelatin solution of the dyes, or to fix the dyes by introducing long chain fatty radicals into the dye molecule. The resulting dyes, however, can only be bleached with difficulty.

It has also been proposed to fix the oxonoles of unsubstituted thiobarbituric acid by silver salt formation of the SH groups. This is, however, for the same reasons disadvantageous. Thus, such dye layers are only very slightly discolored in the developer, and in the fixing baths, they can be discolored only if a sufficiently low pH is used and even then they will only discolor slowly.

In addition, the steep absorption curve which is characteristic of oxonoles is broadened so greatly that these dyes are no longer suitable for use in filter layers for multi-layered color materials.

It is among the objects of the invention to provide dyes for antihalation layers or filter layers for photographic materials which do not have the above disadvantages and which satisfy the requirements of photographic practice as regards the resistance to diffusion, ability to be washed out or bleached out and good absorption properties.

We now have found that tri- and penta-methine oxonoles of disubstituted thiobarbituric acids are especially suitable for use as antihalation and filter dyes for photographic materials if they are fixed as silver salts.

The dyes according to the invention are characterized by the following general formula:

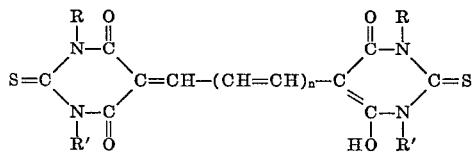

in which:

R, R′=saturated or unsaturated aliphatic groups having preferably up to 4 carbon atoms, such as methyl, ethyl, propyl, butyl or allyl, which alkyl group may be substituted, e.g. with halogen atoms such as chlorine, hydroxyl or alkoxy groups having preferably short-chain alkyl radicals up to 3 carbon atoms, such as methoxy or ethoxy, carboxyl, esterified carboxyl, phenyl such as benzyl or phenyl ethyl etc.
$n=1$ or 2.

The properties of the dye as regards solubility, diffusion resistance and capacity for discoloration can be influenced as desired by suitable choice of the substituents R and R′ so that the dyes can be adapted to the particular purpose for which they are to be used. It is, of course, to be understood that the compounds of the above formula may also be used in the form of their salts, e.g. salts with alkali metals or amines of any type.

Compounds of the following formulae, for example, are suitable:

(1) 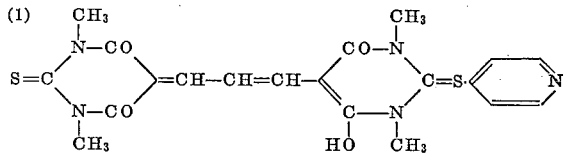

M.P. 257–259°

(2) 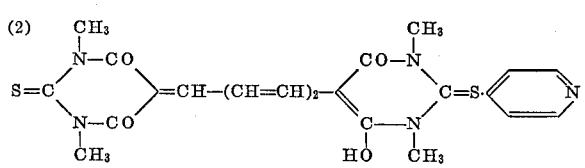

M.P. 223°

(3) 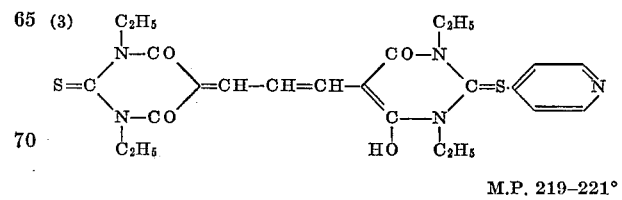

M.P. 219–221°

(4) 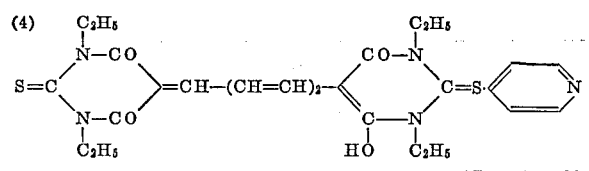
M.P. 171–172°
(5) 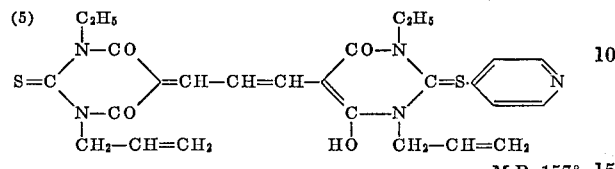
M.P. 157°
(6) 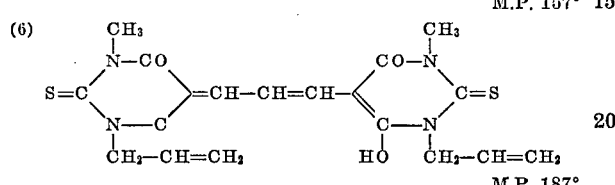
M.P. 187°
(7) 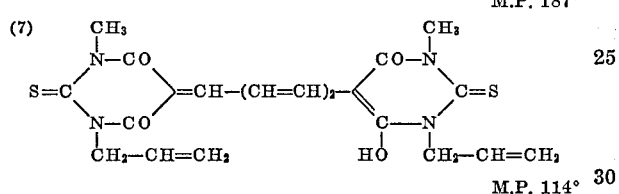
M.P. 114°
(8) 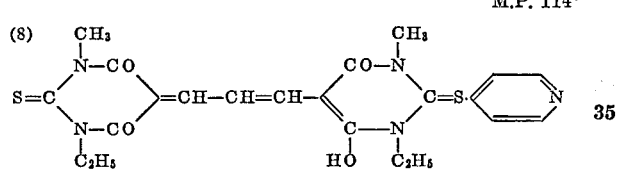
M.P. 233–235°
(9) 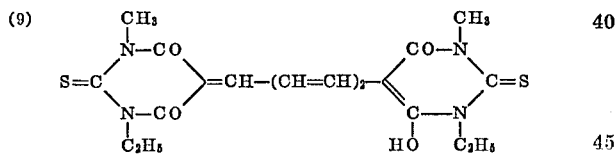
M.P. 134°
(10) 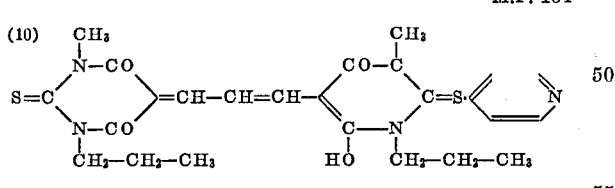
M.P. 230–232°
(11) 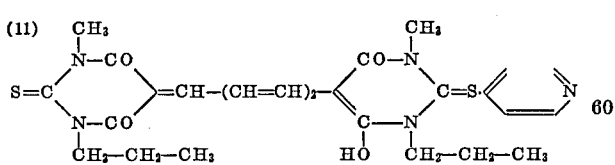
M.P. 140–142°
(12) 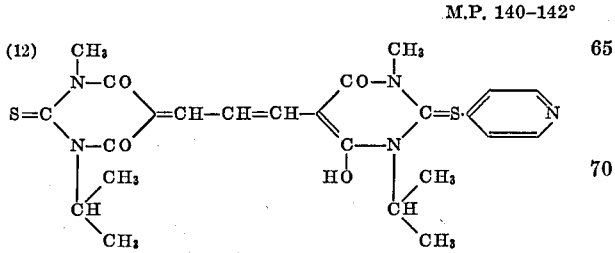
M.P. 296°
(Decomposition)
(13) 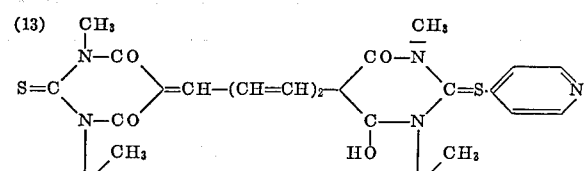
M.P. 223–225°
(14) 
M.P. 218–223°
(15) 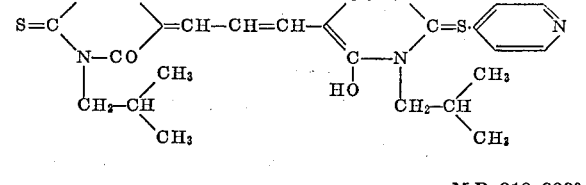
M.P. 137–140°
(16) 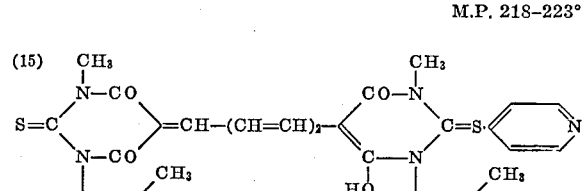
M.P. 183–185°
(Decomposition)
(17) 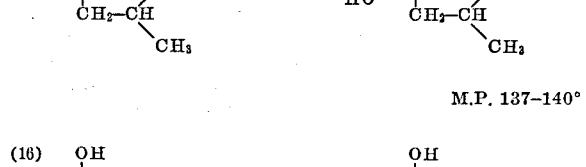
M.P. 219°
(Decomposition)
(18) 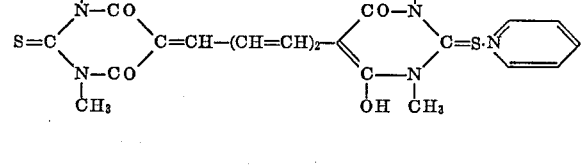
M.P. 173–176°

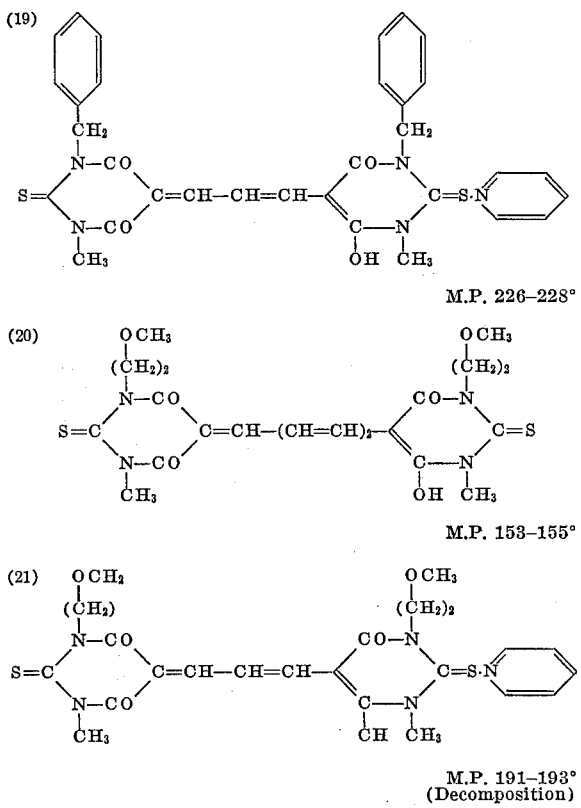

M.P. 226–228°

M.P. 153–155°

M.P. 191–193°
(Decomposition)

The dyes which may be used in the process according to the invention can be prepared by the usual processes, for example, a trimethine oxonole ($n=1$) is obtained by condensation of a corresponding substituted thiobarbituric acid with trimethoxypropene, trimethoxypropane, or 1-anilino-3-phenyl-imino-propene hydrochloride; a pentamethine oxonole ($n=1$) is obtained by condensation with 1-anilino-5-phenylimino-1,3-pentadiene hydrochloride or with 2,4-dinitro-phenyl-pyridinium chloride. The condensations may be carried out in a basic solvent, such as pyridine, or in an alcohol in the presence of an added base such as triethylamine.

Preparation of the dyes 3 and 4 is described in detail below.

DYE 3

9 g. of tetramethoxy-propane, 5 ml. of water and 0.5 ml. of concentrated hydrochloric acid are heated together to 40° C. with stirring until a clear solution is obtained. 20 g. of diethylthiobarbituric acid dissolved in 25 ml. of pyridine are then added at 40° C. The mixture is then kept at 50° C. for 15 minutes, diluted with 50 ml. of methanol and cooled, and the dye which has crystallized out is removed by suction filtration and washed with 25 ml. of methanol. Yield: 20.8 g., M.P. 219–221° C.

DYE 4

A solution of 60 g. of diethylthiobarbituric acid in 75 ml. of pyridine is added dropwise to 42 g. of 2,4-dinitrophenyl-pyridinium chloride dissolved in 75 ml. of pyridine in the course of 15 minutes with cooling to 14–15° C. The mixture is then stirred for another 2 hours, during which time the temperature is allowed to rise to 25° C. The dye which crystallizes out is removed by suction filtration and washed 3 times with 50 ml. portions of methanol. Yield: 69 g., M.P. 171–172° C.

The dyes according to the invention may be used for any conventional photographic materials which contain one or more light-sensitive silver halide emulsion layers. The dyes may also be mixed with other dyes for such purposes.

When the dyes are used in antihalation layers, the layers which contain the dyes according to the invention may be applied to one or both sides of the support. The layers may be arranged both on the rear surface of the support and between the support and a light-sensitive layer. Suitable support materials are the usual photographic supports, e.g. foils of cellulose esters, polycarbonates, especially those based on bis-phenol alkanes, polyesters, especially polyethylene terephthalate, etc.

A particularly suitable binder for the antihalation layers or filter layer is gelatin, but this may be partly or entirely replaced by other hydrophilic binders such as polyvinyl alcohols, poly-N-vinyl pyrrolidone, carboxymethyl cellulose or cellulose derivatives in general, alginic acid or its derivatives and others.

When used, the dyes according to the invention are first dissolved in the usual manner in water or in a mixture of water and a water-soluble solvent such as a lower alcohol, and then added to the gelatin casting solution. The layers which contain the dyes are then cast and dried in the usual manner. The finished layers contain the dyes in quantities of 100 to 1000 mg./m.$^2$.

The dyes are present in the form of their silver salts. In order to obtain the silver salts it has proved sufficient to apply solution of the dyes together with a silver salt solution by an aqueous solution of silver nitrate. Upon mixing the said solution a silver salt is formed with the hydroxy groups of the oxonole dyes.

The dyes which may be used according to the invention are distinguished by being especially easily and quickly discolored in the usual photographic treatment processes, and they yield filter layers which have a particularly steep decay of the absorption towards longer wavelengths.

Example 1

The following solutions:

5 ml. of 10% saponin solution,
2.1 ml. of N/10 silver nitrate solution,
100 mg. of dye 3 dissolved in 30 ml. of methanol, and
2 ml. of N/10 triethylamine solution are added with vigorous stirring to 130 ml. of a 10% aqueous gelatin solution.

When the dye solution has solidified, it is shredded and washed with water, and after the addition of 0.3 ml. of a 30% aqueous formaldehyde solution, and appropriate dilution with water or gelatin solution, it is used directly for the production of a filter layer between the green-sensitive and red-sensitive layers of a color reversing material. The absorption of a filter layer produced in this way is shown in curve 1 of the appended figure.

Example 2

The following solutions:

5 ml. of 10% aqueous saponin solution,
6.1 ml. of N/10 silver nitrate solution,
300 ml. of dye 4 dissolved in 30 ml. of methanol, and
6 ml. of N/10 triethylamine solution are added with stirring to 130 ml. of a 10% gelatin solution.

When the resulting dye solution has solidified, it is shredded and washed with water, and after the addition of 0.3 ml. of an aqueous solution (30%) of formaldehyde and dilution with water, it is applied to two samples of a cellulose acetate support which is covered with a layer of adhesive. The absorption of a layer produced in this way is shown in curve 2 of the figure attached hereto.

A layer of sensitized silver bromide gelatin emulsion is then applied onto the two samples. In one case, it is applied to the blank surface, the dye layer then serving as NC-layer or antihalo layer. In the case of the other sample, the light-sensitive layer is applied to the dye layer. The dye layer is thus arranged between the support and the emulsion layer. Both materials are treated with a developer of the following composition:

| | | |
|---|---|---|
| p-Methylaminophenol | g | 5 |
| Hydroquinone | g | 6 |
| Sodium sulfite | g | 40 |
| Potassium carbonate | g | 40 |
| Potassium bromide | g | 2 |
| Water | ml | 1000 |

Both dye layers are completely and irreversibly discolored after the development. The dye is not reformed during the the subsquent fixing and washing with water.

Microscopic examination of the cross-section of the above materials shows that the dye is completely resistant to diffusion. No coloration of the emulsion layer can be detected.

Example 3

The following solutions are added with stirring to 130 ml. of a 10% gelatin solution:

5 ml. of 10% saponin solution,
8.2 ml. of N/10 silver nitrate solution,
a solution of 100 mg. of dye 3 and 300 mg. of dye 4 in 30 ml. of methanol, and 8 ml. of N/10 triethylamine solution.

When the dye solution has solidified, it is shredded and washed with water, and after dilution with water is worked up as described in Example 2. The absorption of such a filter layer is shown in curve 3 of the appended figure. It will be seen from this curve that the absorption is greatly increased in width by mixing the two dyes, and the absorption maxima of the individual dyes at the same time fuse to form a new maximum. When such a material is processed as in Example 2, the dye layers are discolored completely and irreversibly.

We claim:
1. A light-sensitive photographic material containing at least one silver halide emulsion layer and one antihalation or filter layer, characterized in that the antihalation or filter layer contains silver salts of compounds of the following formula:

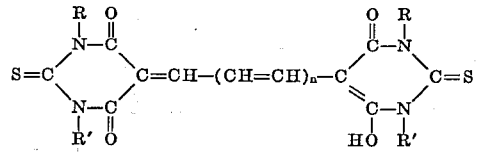

in which:
R, R' stands for a saturated or unsaturated aliphatic group
$n$ is 1 or 2.
2. The light-sensitive material of claim 1, wherein R or R' represents an alkyl radical having up to 4 carbon atoms.
3. The light-sensitive material of claim 1, wherein R and R' stands for ethyl.

References Cited

UNITED STATES PATENTS

| 2,266,441 | 12/1941 | Peterson | 96—84 |
| 2,274,782 | 3/1942 | Gaspar | 96—84 |
| 2,697,037 | 12/1954 | Jelley et al. | 117—33.3 |

FOREIGN PATENTS 1,077,049  7/1967  Great Britain.

NORMAN G. TORCHIN, Primary Examiner
RONALD H. SMITH, Assistant Examiner

U.S. Cl. X.R.
117—33.3; 252—300